United States Patent
Nicolaus et al.

(10) Patent No.: US 9,758,678 B2
(45) Date of Patent: Sep. 12, 2017

(54) PROTECTING PARTS MADE OF CARBON-CONTAINING COMPOSITE MATERIAL FROM OXIDATION

(71) Applicant: MESSIER-BUGATTI-DOWTY, Velizy Villacoublay (FR)

(72) Inventors: Nathalie Nicolaus, Lyons (FR); Véronique Fontarnou, Meyzieu (FR); Nadia Roussarie, Corbas (FR); Julien Sniezewski, Les Haies (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 228 days.

(21) Appl. No.: 14/682,351

(22) Filed: Apr. 9, 2015

(65) Prior Publication Data
US 2015/0291805 A1 Oct. 15, 2015

(30) Foreign Application Priority Data
Apr. 10, 2014 (FR) ...................................... 14 53198

(51) Int. Cl.
C09D 5/08 (2006.01)
C04B 41/50 (2006.01)
(Continued)

(52) U.S. Cl.
CPC ............ C09D 5/084 (2013.01); B05D 3/0254 (2013.01); C04B 41/009 (2013.01); C04B 41/507 (2013.01); C04B 41/5022 (2013.01); C04B 41/5041 (2013.01); C04B 41/5042 (2013.01); C04B 41/5058 (2013.01); C04B 41/5061 (2013.01); C04B 41/5092 (2013.01); C04B 41/5133 (2013.01); C04B 41/52 (2013.01);
(Continued)

(58) Field of Classification Search
CPC combination set(s) only.
See application file for complete search history.

(56) References Cited

U.S. PATENT DOCUMENTS

| 2007/0026153 A1 | 2/2007 | Nicolaus et al. |
| 2008/0199681 A1* | 8/2008 | Murphy .............. C04B 35/6269 428/312.8 |
| 2008/0311301 A1 | 12/2008 | Diss et al. |

FOREIGN PATENT DOCUMENTS

FR    2 893 939 A1    6/2007

OTHER PUBLICATIONS

Preliminary Search Report as issued in French Patent Application No. 1453198, dated Dec. 2, 2014.

* cited by examiner

*Primary Examiner* — Erma Cameron
(74) *Attorney, Agent, or Firm* — Pillsbury Winthrop Shaw Pittman LLP (57) ABSTRACT

A method of protecting a part made of carbon-including composite material against oxidation, the method including a) applying a coating composition on at least a portion of the outside surface of the part, the coating composition being in the form of an aqueous suspension including: a metallic phosphate; a powder of a compound comprising titanium; and a $B_4C$ powder; and b) applying heat treatment to the coating composition applied during step a) with a treatment temperature lying in the range 330° C. to 730° C. being imposed during the heat treatment in order to obtain a coating on the outside surface of the part, the coating including a first phase in which the metallic phosphate is in crystalline form and a second phase in which the metallic phosphate is in amorphous form.

12 Claims, 5 Drawing Sheets

(51) Int. Cl.
*C04B 41/52* (2006.01)
*C04B 41/83* (2006.01)
*C04B 41/51* (2006.01)
*C04B 41/85* (2006.01)
*C04B 41/89* (2006.01)
*C04B 41/00* (2006.01)
*B05D 3/02* (2006.01)
*C04B 111/00* (2006.01)

(52) U.S. Cl.
CPC ............ *C04B 41/522* (2013.01); *C04B 41/83* (2013.01); *C04B 41/85* (2013.01); *C04B 41/89* (2013.01); *C04B 2111/00362* (2013.01); *F16D 2250/0046* (2013.01)

PROTECTING PARTS MADE OF CARBON-CONTAINING COMPOSITE MATERIAL FROM OXIDATION

CROSS REFERENCE TO RELATED APPLICATIONS

This application claims priority to French Application No. 1453198, filed Apr. 10, 2014, the contents of which are incorporated herein by reference in their entirety.

FIELD

The invention relates to providing protection against oxidation for parts made of a carbon-containing composite material, i.e. a material having fiber reinforcement densified by a matrix in which the fiber reinforcement and/or the matrix and/or an interphase coating between the reinforcing fibers and the matrix is/are made of carbon. The particular field of application of the invention is providing protection against oxidation for parts made of carbon/carbon (C/C) composite material, in particular C/C composite brake disks, in particular brake disks for aircraft, e.g. airplanes, or brake disks for terrestrial vehicles.

BACKGROUND

In an oxidizing medium, the ability of such parts to conserve good mechanical properties at high temperatures depends on providing the carbon with effective protection against oxidation. After being prepared, the composite material usually presents residual internal pores that give the ambient medium access to the core of the material.

Furthermore, in certain applications, the protection against oxidation must continue to be effective in the presence of moisture and/or catalysts for oxidizing carbon. This applies in particular to airplane brake disks made of C/C composite since they can be exposed to water present on runways and they can come into contact with catalysts for oxidizing carbon, e.g. provided by potassium formiates or acetates present in de-icing substances commonly used on runways.

Document US 2008/311301 describes a method of providing protection against oxidation for parts made of porous material containing carbon, and in particular brake disks made of C/C composite material, which method consists in applying a composition in an aqueous medium that comprises: a metallic phosphate in aqueous solution such as aluminum hydrogen-phosphate $Al(H_2PO_4)_3$ or "monoaluminum phosphate" (MALP), a powder of boron or of a boron compound such as $B_2O_3$, titanium powder, and an alkali or alkaline earth element M that catalyzes carbon oxidation, in the presence of oxygen, so as to form a P—O—Ti-M association bonded by the boron oxide $B_2O_3$ and trapping the element M. Final heat treatment is performed at about 350° C. under air, and possibly at about 700° C. under a non-oxidizing atmosphere ($N_2$). Such a composition is effective against catalytic oxidation of carbon. Nevertheless, the use of boron powder in an industrial environment can require special precautions to be put into place because of its toxicity. In addition, boron oxide $B_2O_3$ presents high sensitivity to moisture and vaporizes at temperatures below 900° C. In addition, the composition may be unstable and difficult to use, since boron and $B_2O_2$ react with monoaluminum phosphate.

Document US 2007/0026153 also describes a method of protecting parts made of carbon-containing composite material, and in particular brake disks made of C/C composite material. In a first step of the method, internal protection is put into place by impregnating with an aqueous solution of metallic phosphate, such as monoaluminum phosphate, and applying heat treatment at about 700° C. under nitrogen ($N_2$). Thereafter, a liquid composition is applied that contains, in an aqueous medium, colloidal silica $SiO_2$, a powder of "Pyrex®" type borosilicate glass, and powdered titanium diboride $TiB_2$. In service and in an oxidizing medium, $TiB_2$ oxidizes so as to form $B_2O_3$, thereby regenerating the $B_2O_3$ and conserving a borosilicate glass phase having healing capacity by passing into a pasty state as from 600° C. Nevertheless, the lifetime of the protection is relatively limited in the event of repeated exposure to a wet environment because of the disappearance of $B_2O_3$ and the consumption of $TiB_2$. In addition, improving protection against catalytic oxidation of carbon may be desirable, in particular with respect to de-icing agents of the potassium formiate type, which can have a relatively strong tendency to become impregnated within the material because of their surface tension.

SUMMARY

An aspect of the invention is to provide a method making it possible to improve protection against oxidation of parts made of carbon-containing composite material, in a wet environment at high temperature and in the presence of catalysts for carbon oxidation, while being easy to implement, in particular when mass-producing parts. Another aspect of the invention is to provide novel methods of treating parts made of carbon-containing composite material that makes it possible to obtain improved performance when the parts are used for braking vehicles, in particular in the field of aviation.

In an embodiment, there is provided a method of protecting a part made of carbon-including composite material against oxidation, the method comprising the following steps:

a) applying a coating composition on at least a portion of the outside surface of the part, the coating composition being in the form of an aqueous suspension comprising:
   a metallic phosphate;
   a powder of a compound comprising titanium; and
   a $B_4C$ powder; and b) applying heat treatment to the coating composition applied during step a) with a treatment temperature lying in the range 330° C. to 730° C. being imposed during the heat treatment in order to obtain a coating on the outside surface of the part, the coating comprising a first phase in which the metallic phosphate is in crystalline form and a second phase in which the metallic phosphate is in amorphous form.

The crystalline and amorphous phases of metallic phosphate can be detected by one-dimensional (in) and two-dimensional (2D) nuclear magnetic resonance (NMR) spectroscopy to detect solid nuclei such as $^{31}P$ and $^{27}Al$.

An embodiment of the invention relies firstly on selecting novel coating compositions, and secondly on applying a particular temperature once the coating composition has been applied. During the heat treatment, a temperature is imposed that is sufficiently high to ensure that, within the coating, an association is obtained of at least one crystalline metallic phosphate phase and at least one amorphous metallic phosphate phase. Nevertheless, the temperature imposed during step b) remains low enough to avoid crystallizing all of the metallic phosphate, and consequently so as to conserve some amorphous metallic phosphate phase in the resulting coating.

The metallic phosphate present in the coating serves simultaneously to act as a binder, to provide protection against catalytic oxidation of carbon, and to provide a self-healing function. These beneficial properties stem from the combined presence in the coating of the amorphous metallic phosphate and of the crystalline metallic phosphate. The amorphous metallic phosphate has coating capacity in the amorphous state whereby it provides the self-healing function by filling in the pores and/or cracks present in the surface of the part at its utilization temperatures, so as to avoid oxidizing species penetrating into said part (protection against thermal oxidation). The amorphous phase also serves to provide good cohesion between the coating and the underlying part, which may previously have been protected by an internal protection layer, as described in greater detail below. The crystalline metallic phosphate serves to impart protection against catalytic oxidation of carbon by trapping carbon oxidation catalysts, which catalysts may come for example from de-icing substances for runways or roads, or from detergents.

Thus, by associating metallic phosphate in amorphous form with metallic phosphate in crystalline form in the coating that is formed, an embodiment of the present invention beneficially makes it possible to give carbon-containing substrates very good protection against oxidation in the presence of oxidation catalysts over a wide range of temperatures.

As a source of boron suitable for generating $B_2O_3$, boron carbide $B_4C$ is relatively inexpensive, more easily available commercially, and easier to use than boron B. The presence of $B_4C$ also makes it possible to obtain a coating that provides better protection against oxidation at high temperature compared with using B or $ZrB_2$, in particular. Furthermore, unlike B and $B_2O_3$, $B_4C$ reacts very little with the metallic phosphate, thus making it possible to conserve a stable composition for the coating, and $B_4C$ presents an oxidation rate that is slower than that of B thus making it possible to constitute a durable source of boron in spite of $B_2O_3$ being eliminated in the presence of water.

When the coating composition has non-oxidized titanium-comprising compounds, they may beneficially be oxidized by the oxygen of the ambient medium, and can consequently reduce the quantity of oxygen available for oxidizing carbon. Once in oxidized form, the titanium-comprising compound can become incorporated in the vitreous phase that provides the part with high temperature protection, thereby enabling its softening temperature to be adjusted so as to come close to the highest utilization temperature of the part. This beneficially enables the vitreous phase to present a softening temperature that is ideal for providing good protection at the utilization temperature of the part.

In particular, during the heat treatment, the treatment temperature may be applied for a duration that is greater than or equal to 1 hour (h), e.g. lying in the range 1 h to 15 h.

The heat treatment may be performed under an oxidizing atmosphere, e.g. under air. In a variant, the heat treatment may be performed under an inert atmosphere, e.g. under nitrogen.

The proportion of metallic phosphate in amorphous form obtained in the coating after step b) may depend on the treatment temperature and on the duration for which it is applied. For example, an increase in the duration for which the treatment temperature is applied can lead to a lowering of the proportion of metallic phosphate in amorphous form in the coating.

In an embodiment, after step b), the resulting coating may be such that the ratio of the weight of metallic phosphate in amorphous form in the coating divided by the total weight of metallic phosphate in the coating (in both forms, amorphous and crystalline) is greater than or equal to 0.1, and in an embodiment greater than or equal to 0.2. In particular, this ratio may lie in the range 0.1 to 0.7, and in an embodiment in the range 0.2 to 0.5.

Beneficially, the coating composition may also include an organic dispersing agent. The organic dispersing agent is beneficially sufficiently wetting to give the resulting coating very good adhesion on the underlying part.

The organic dispersing agent may be a water soluble and non-ionic organic dispersing agent of the oxyethylene fatty acid, oxyethylene fatty alcohol, oxyethylene aklyl-phenol, or higher polyol ester type. The organic dispersing agent may also be an alkoxylated acetylenic polyol, e.g. as sold under the name "Surfynol®" by the US supplier Air Products Chemicals, Inc. It is also possible to use as the organic dispersing agent substances sold under the name "Levenol®" by the supplier KAOI Corporation, or "Marlophen NP9" by the supplier Sasol GmbH.

In an implementation, the titanium-comprising compound is selected from: titanium metal (Ti), titanium diboride ($TiB_2$), titanium carbide (TiC), titanium dioxide ($TiO_2$), and mixtures thereof. In an embodiment, the coating composition may include a powder of titanium metal and/or a powder of titanium diboride.

In addition, the coating composition may include a refractory filler. Before step a), this filler may be present in the coating composition at a content by weight that is less than or equal to 5%. This filler may include one or more refractory oxides, nitrides, or carbides (other than $B_4C$).

Furthermore, concerning the metallic phosphate that is used, the coating composition may include an aluminum phosphate, e.g. aluminum hydrogen-phosphate $Al(H_2PO_4)_3$.

In an implementation of the invention, the coating composition may comprise, before step a):
the metallic phosphate at a content by weight lying in the range 27% to 36%;
the $B_4C$ powder at a content by weight lying in the range 11.5% to 21%; and
the powder of the titanium-comprising compound at a content by weight lying in the range 8% to 18%.

When the coating composition has a plurality of different titanium-comprising compounds, the term "the coating composition comprising . . . powder of the titanium-comprising compound at a content by weight lying in the range 8% to 18%" should be understood as meaning that the sum of the contents by weight of the various titanium-comprising compounds lies in the range 8% to 18%.

In an implementation of the invention, the coating composition may comprise, before step a):
aluminum phosphate at a content by weight lying in the range 27% to 36%;
the $B_4C$ powder at a content by weight lying in the range 11.5% to 21%;
the powder of the titanium-comprising compound at a content by weight lying in the range 8% to 18%;
an alkoxylated acetylenic polyol at a content by weight lying in the range 0.1% to 1.5%;
water at a content by weight lying in the range 33% to 50%; and optionally a refractory filler at a content by weight less than or equal to 5%.

In particular, the coating composition before step a) may be constituted by:
- aluminum phosphate at a content by weight lying in the range 27% to 36%;
- a $B_4C$ powder at a content by weight lying in the range 11.5% to 21%;
- a powder of at least one titanium-comprising compound at a content by weight lying in the range 8% to 18%;
- an alkoxylated acetylenic polyol at a content by weight lying in the range 0.1% to 1.5%;
- water at a content by weight lying in the range 33% to 50%; and
- optionally a refractory filler at a content by weight less than or equal to 5%.

In an implementation, the coating composition may further include a self-healing vitreous compound.

In an implementation, at least one internal protection layer may be formed before step a) by impregnating at least a portion of the part made of composite material with an impregnation composition including a metallic phosphate.

The impregnation composition may be an aqueous solution.

The impregnation composition may include an aluminum phosphate, e.g. aluminum hydrogen-phosphate.

An embodiment of the present invention also provides a coating composition in the form of an aqueous suspension comprising:
- a metallic phosphate;
- a powder of a compound comprising titanium; and
- a $B_4C$ powder.

The coating composition of an embodiment of the invention may be for use in performing a method as described above.

In an embodiment, the composition may comprise:
- the metallic phosphate at a content by weight lying in the range 27% to 36%;
- the $B_4C$ powder at a content by weight lying in the range 11.5% to 21%; and
- the powder of the titanium-comprising compound at a content by weight lying in the range 8% to 18%.

In an embodiment, the composition may comprise:
- aluminum phosphate at a content by weight lying in the range 27% to 36%;
- the $B_4C$ powder at a content by weight lying in the range 11.5% to 21%;
- the powder of the titanium-comprising compound at a content by weight lying in the range 8% to 18%;
- an alkoxylated acetylenic polyol at a content by weight lying in the range 0.1% to 1.5%; and
- water at a content by weight lying in the range 33% to 50%.

In particular, the composition may be constituted by:
- aluminum phosphate at a content by weight lying in the range 27% to 36%;
- a $B_4C$ powder at a content by weight lying in the range 11.5% to 21%;
- a powder of at least one titanium-comprising compound at a content by weight lying in the range 8% to 18%;
- an alkoxylated acetylenic polyol at a content by weight lying in the range 0.1% to 1.5%;
- water at a content by weight lying in the range 33% to 50%; and
- optionally a refractory filler at a mass content less than or equal to 5%.

More generally, the characteristics of the coating composition described above in the context of the method of an embodiment of the invention apply to this aspect of the invention.

In an embodiment, dry titanium may be used for constituting the titanium-comprising compound present in the coating composition of the invention.

The use of dry titanium may be economically beneficial since dry titanium is available in industrial quantities at a relatively low price.

BRIEF DESCRIPTION OF THE DRAWINGS

Other features and benefits of the method appear on reading the following description made by way of non-limiting indication and with reference to the accompanying drawings, in which.

DETAILED DESCRIPTION

In the description below, protection against oxidation is to be given to parts made of C/C composite material, and more particularly to brake disks. More generally, an embodiment of the invention is applicable to protecting any kind of part made of carbon-containing composite material against oxidation.

Figure 1:
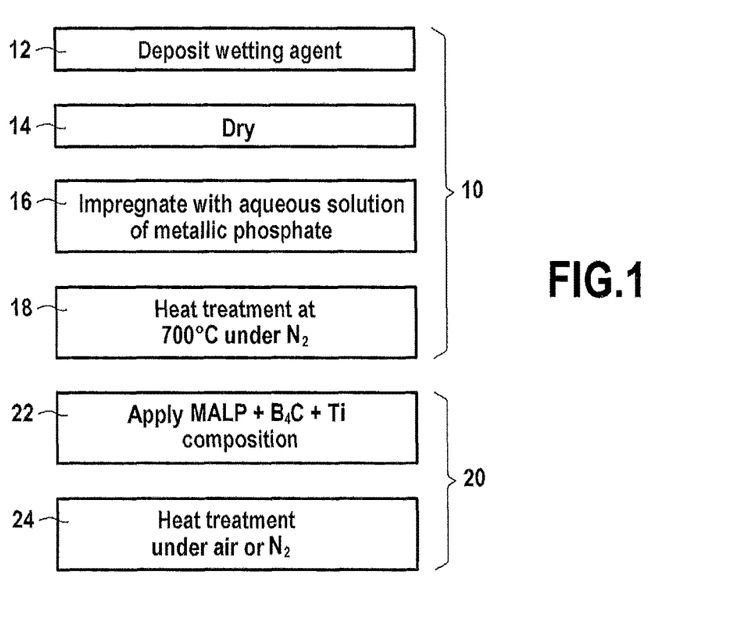
FIG. 1 shows successive steps of an example method of an embodiment of the invention.

In a particular implementation of the method as shown in FIG. 1, a first stage 10 consists in forming internal protection within the accessible pores of the part or within a portion of the part to be protected, which internal protection comprises at least one metallic phosphate suitable in particular for providing protection against catalytic oxidation of carbon.

It is possible to proceed as described in Document U.S. Pat. No. 5,853,821. A first step 12 consists in depositing a wetting agent within the accessible pores of the composite material. For this purpose, use is made of an aqueous solution of a wetting agent, such as for example the substance sold by the German supplier Sasol GmbH under the name "Marlophen NP9". After the composite material has been impregnated with this wetting solution and after drying (step 14), a first impregnation composition in the form of an aqueous solution containing a metallic phosphate is applied to the entire outside surface of the part, or selectively to a portion of the outside surface of the part, e.g. using a brush or by spraying (i.e. spray gun) (step 16). By way of example, use is made of an aqueous solution of aluminum hydrogenphosphate $Al(H_2PO_4)_3$. The metallic phosphate may also be a zinc phosphate, e.g. having the following chemical formula: $Zn_3(PO_4)_2.xH_2O$, a manganese phosphate, e.g. having the following chemical formula: $Mn(H_2PO_4)_2.2H_2O$, or indeed a magnesium phosphate, e.g. having the following chemical formula: $Mg_3(PO_4)_2.8H_2O$.

The wetting agent present on the surface of the accessible pores of the composite material facilitates penetration of the impregnation composition within the accessible pores of the composite material. Drying followed by heat treatment (step 18) are then performed in order to limit the surface accessibility of the pores by virtue of metallic phosphate internal protection. The heat treatment is performed by raising the temperature up for a dwell of one or several hours at a temperature lying in the range 200° C. to 750° C., e.g. about 700° C. under a non-oxidizing atmosphere, e.g. under nitrogen ($N_2$).

A second stage 20 of the method consists in forming a covering and coating outer protective coating.

For this purpose, it is possible to use a second composition (also referred to as a coating composition) that is constituted essentially (i.e. at least 90% by weight) by at least one metallic phosphate, a boron carbide $B_4C$ powder, a titanium powder, at least one dispersing agent, and water.

The metallic phosphate may be aluminum hydrogenphosphate $Al(H_2PO_4)_3$. Such a compound is commercially available in an aqueous solution at 48% to 50% by weight. In the same manner as above, it is possible to use a phosphate of zinc, of manganese, or of magnesium.

The boron carbide $B_4C$ may be in the form of particles having a size less than or equal to 30 micrometers ($\mu m$), e.g. less than or equal to 7.5 $\mu m$. Unless mentioned to the contrary, the term "size" is used to mean the dimension given by statistical grain size distribution at half the population, referred to as D50.

The powdered titanium used may be in the form of dry titanium particles (not in suspension in water) having a size that is preferably less than 150 $\mu m$. Refractory fillers other than $B_4C$ may be added in a proportion that is in an embodiment less than 10% by weight, e.g. one or more ceramic powders of oxide, nitride, or carbide type.

The organic dispersing agent may be as mentioned above, and in particular it may be an alkoxylated acetylenic polyol sold under the name "Surfynol®", and in particular "Surfynol® 440", As mentioned above, this organic dispersing agent may be sufficiently wetting to provide very good cohesion between the coating and the underlying part. The organic dispersing agent may enable the metallic phosphate of the second composition to penetrate into the residual pores in order to create anchor points that are chemically and mechanically strong with the internal protection underlayer of metallic phosphate.

The additional refractory fillers, e.g. one or more ceramics of oxide, nitride, or carbide type may be in the form of particles that in an embodiment have a size of less than 150 $\mu m$.

By way of example, the second composition is applied with a brush or by spraying (step 22) on the outside surface of the part or on a portion of its outside surface, in an embodiment at the same locations as the first composition. For brake disks made of carbon-based composite material, application of the first composition and of the second composition may be limited to those outside surface portions that are not friction portions, the friction annular surface of an end disk in a set of stator and rotor disks, or the opposite friction surfaces of disks situated between the end disks then not being impregnated in order to avoid spoiling their tribological properties. Thereafter, final heat treatment is performed (step 24) raising temperature gradually up to a value lying in the range 330° C. to 730° C., with a dwell of one or several hours at that temperature. The relatively moderate temperature of the heat treatment serves to conserve the metallic phosphate phase in the amorphous state, thereby preserving its coating capacity. The heat treatment of step 24 is not necessarily performed under a non-oxidizing atmosphere. This heat treatment may be performed under air or under nitrogen. In particular, this heat treatment may be performed under air up to 350° C. or under nitrogen above 350° C.

The quantity of the second composition to be applied may be selected so that during step b) a coating is obtained on the outside surface of the part that is of mean thickness (arithmetic mean) lying in the range 20 $\mu m$ to 150 $\mu m$. An embodiment of the invention beneficially makes it possible to have very good protection against oxidation with a coating of thickness that is significantly thinner than the coatings known in the prior art.

The thickness of the coating is measured perpendicularly to the outside surface of the coated part.

EXAMPLE 1

Parts made of C/C composite material for airplane brake disks of density lying in the range 1.65 grams per cubic centimeter (g/cm$^3$) to 1.9 g/cm$^3$ approximately and with residual porosity in volume terms lying in the range 6% to 18% approximately were provided with anti-oxidation protection as follows:
  impregnating with a first composition formed by an aqueous solution of "Marlophen NP 9" and drying;
  robotically applying an aqueous solution of monoaluminum phosphate at 50% by weight of water by means of a brush or by spraying (e.g. a spray gun);
  applying heat treatment under a nitrogen atmosphere ($N_2$) with temperature being raised progressively up to 700° C. and with this temperature being maintained for a minimum of 1 h;
  using a brush or spraying to apply the following second composition comprising by weight:
    67% aqueous solution of monoaluminum phosphate at 50% by weight of water;
    16.3% of $B_4C$ powder with no more than 2% impurities, the grains of the powder having a size of less than 7.5 $\mu m$;
    11% dry titanium powder with grain size distribution up to 150 $\mu m$ (grain size: approximately 90 $\mu m$) or smaller, up to 50 $\mu m$ (grain size: 20 $\mu m$ approximately);
    4.7% water; and
    1% "Surfynol® 440"; and
  applying heat treatment under air by raising temperature progressively up to 350° C. and maintaining this temperature for 10 h.

Depending on the parts, the layer of coating composition (layer of second composition) prior to heat treatment presented a weight per unit area lying in the range 16 milligrams per square centimeter (mg/cm$^2$) to 22 mg/cm$^2$.

Depending on the parts, the coating obtained after heat treatment presented thickness lying in the range 40 µm to 70 µm.

Two similar additional tests were performed in which:
the final heat treatment was performed under air by progressively raising the temperature up to 350° C. and maintaining this temperature for 5 h; and
the final heat treatment was performed under air by raising the temperature progressively up to 450° C. and maintaining this temperature for 8 h.

1D/2D NMR spectroscopic analysis of the $^{31}$P and $^{27}$Al solid nuclei was used to quantify the proportions by weight of the crystalline and amorphous phases of the metallic phosphate in the resulting coating. The results obtained are given in Table 1 below.

TABLE 1

| Sample | Crystalline metallic phosphate content | Amorphous metallic phosphate content |
|---|---|---|
| Example 1: 350° C., 5 h, air | 76% | 24% |
| Example 1: 450° C., 8 h, air | 89% | 11% |

For this second composition example, the temperature from which a coating having both the amorphous monoaluminum phosphate and the crystalline monoaluminum phosphate begins to be obtained is about 330° C.

Parts having the anti-oxidation protection have been subjected to the following oxidation protocols:
P650: exposure at 650° C. to air for 4 h, repeated six times with return to ambient temperature after each exposure;
P850: exposure at 850° C. to air for 30 minutes (min), repeated six times with return to ambient temperature after each exposure;
P1200: exposure at 650° C. for 4 h, return to ambient temperature, followed by exposure to 1200° C. for 15 min, return to ambient temperature, then return twice to 650° C. for 4 h with intermediate return to ambient temperature;
P1200 H$_2$O: same protocol as P1200, but adding 24 h in water at ambient temperature after exposure to 1200° C. and before the two final exposures at 650° C.;
P650AcK: exposure to air at 650° C. for 4 h, followed by pollution with potassium acetate at ambient temperature, then two exposures to air at 650° C. for 4 h with intermediate return to ambient temperature; and
P1200AcK: same protocol as P650AcK, but adding exposure to air at 1200° C. for 15 min after the first exposure to air at 650° C., the pollution with AcK being performed after the exposure at 1200° C.

Figure 2:
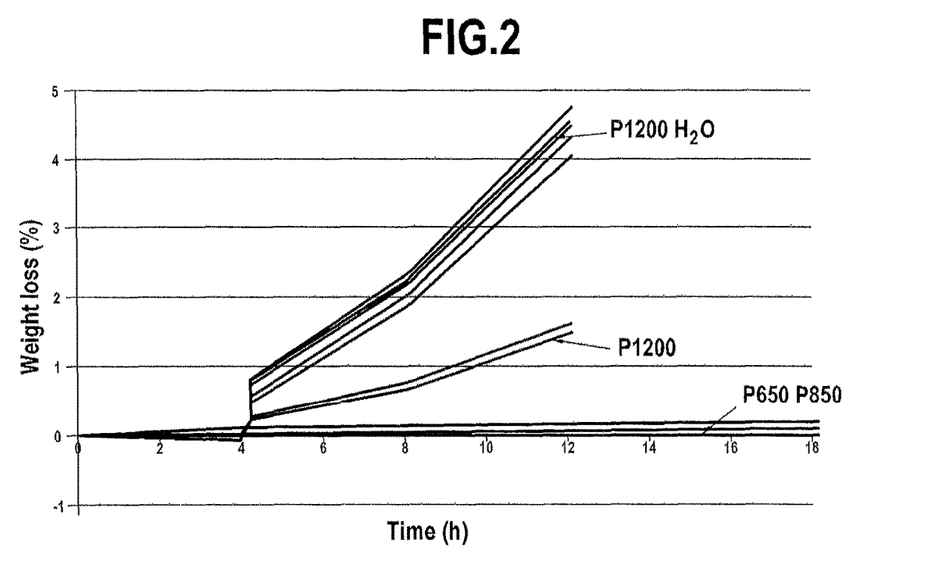
FIG. 2 plots curves illustrating mass variation as a function of oxidation duration for samples made of C/C composite material provided with protection against oxidation by a method of an embodiment of the invention.

FIG. 2 shows the relative loss of weight in percentage for the various parts as measured during the oxidation protocols without potassium acetate pollution, the protection being implemented with a second composition containing titanium powder having grain size distribution less than or equal to 150 µm.

Very good ability to withstand oxidation can be seen including at high temperature and in the presence of water, since loss of weight is less than 5%. By way of comparison, for an oxidation protocol similar to the above P1200H$_2$O protocol, the loss of weight observed for parts protected using the method of Document US 2007/0026153 is about 7%.

Figure 3A:
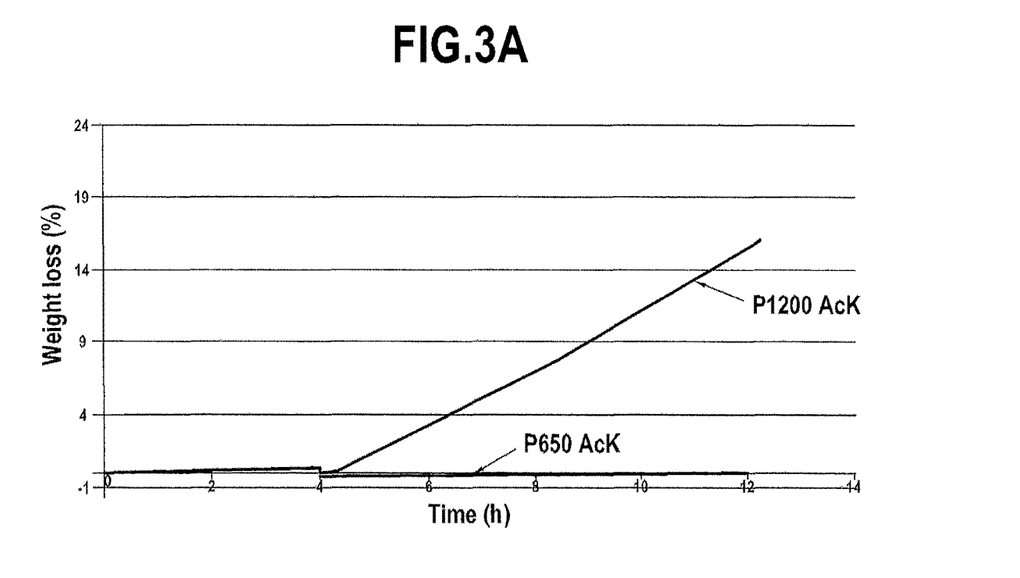
FIGS. 3A and 3B plot curves showing mass variation as a function of oxidation duration for samples made of C/C composite material protected against oxidation by performing methods of an embodiment of the invention and exposed to a carbon oxidation catalyst.

FIG. 3A shows the relative loss of weight in percentage measured during oxidation protocols with potassium acetate pollution, the protection being implemented with a second composition containing titanium powder with grain size distribution less than 50 µm.

Figure 3B:
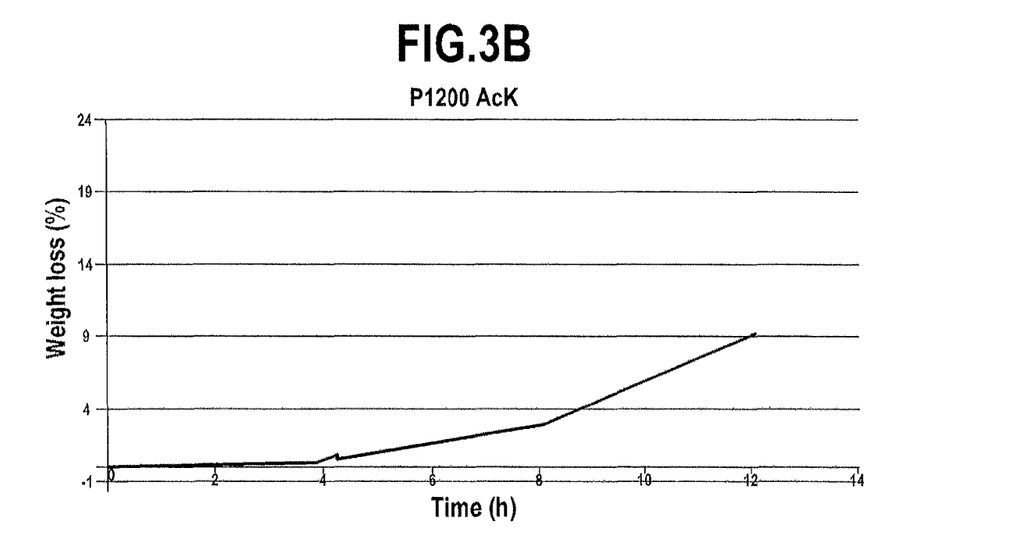

FIG. 3B also shows the performance obtained after performing a method similar to that described above and treatment with a second composition having the following composition by weight:
27.7% monoaluminum phosphate;
13.5% B$_4$C powder;
9% titanium powder;
0.8% Surfynol®; and
49% water.

As shown in FIG. 3B, such a composition, after performing a P1200 AcK protocol, provides excellent protection against catalytic oxidation.

EXAMPLE 2

Technical Effect Produced by Using a B$_4$C Powder

In this example, three compositions have been compared for performance in terms of ability to withstand oxidation. The three compositions under test differed in the chemical nature of the boron compound present.

More precisely, parts made out of C/C composite material for airplane brake disks with density lying in the range 1.6 g/cm$^3$ to 1.9 g/cm$^3$ approximately and with residual porosity by volume lying in the range 6% to 18% approximately were provided with anti-oxidation protection as follows:
impregnating with a first composition formed by an aqueous solution of "Marlophen NP 9" and drying;
using a brush to apply an aqueous solution of monoaluminum phosphate at 50% by weight of water;
applying heat treatment under an atmosphere of nitrogen (N$_2$) with temperature being raised progressively up to 700° C. and maintained at this temperature for a minimum of 1 h;
using a brush to apply the following second composition comprising by weight:
34% monoaluminum phosphate;
16% boron compound (B, ZrB$_2$, or B$_4$C depending on the composition under test);
11.2% titanium powder; and
38.8% water; and
applying heat treatment under air with temperature being raised progressively up to 350° C. and maintained at this temperature for 10 h.

Figure 4:
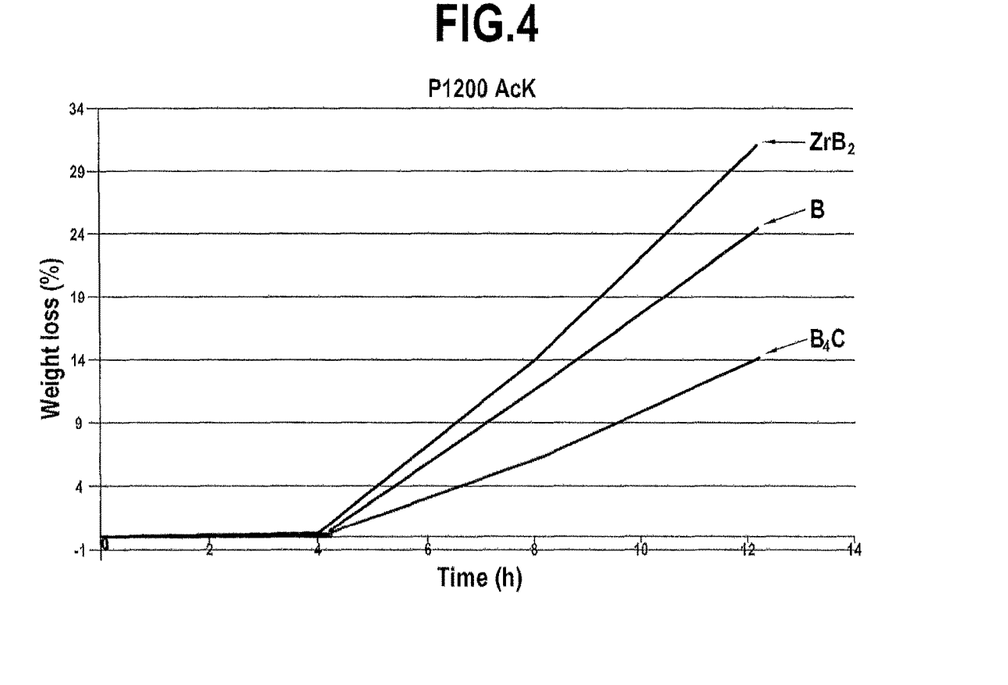
FIG. 4 shows performance in terms of protection against oxidation for coating compositions incorporating various boron compounds.

FIG. 4 shows the performance of the various compositions in terms of protection against oxidation depending on the nature of the boron compound present (protocol used: P1200 AcK).

Incorporating B$_4$C powder in the coating compositions of the invention procures results that are significantly better in terms of protection against oxidation compared with using other powders based on boron, such as powders of boron or of ZrB$_2$.

EXAMPLE 3

Tests Varying the Chemical Nature of the Compound Comprising Titanium

In this test, various coating compositions of the invention were evaluated for performance in terms of the resistance they imparted to oxidation. Each of the coating compositions incorporated a different titanium-comprising compound.

Parts made of C/C composite material for airplane brake disks having density lying in the range 1.65 g/cm³ to 1.9 g/cm³ approximately and residual porosity by volume lying in the range 6% to 18% approximately were provided with anti-oxidation protection as follows:
- impregnating with a first composition formed by an aqueous solution of "Marlophen NP 9" and drying;
- using a brush to apply an aqueous solution of monoaluminum phosphate at 50% by weight of water;
- applying heat treatment under an atmosphere of nitrogen ($N_2$) by raising temperature progressively up to 700° C. and maintaining this temperature for 1 h minimum;
- using a brush to apply the second composition; and
- applying heat treatment under air by progressively raising temperature to 350° C. and maintaining this temperature for 10 h.

Figure 5:
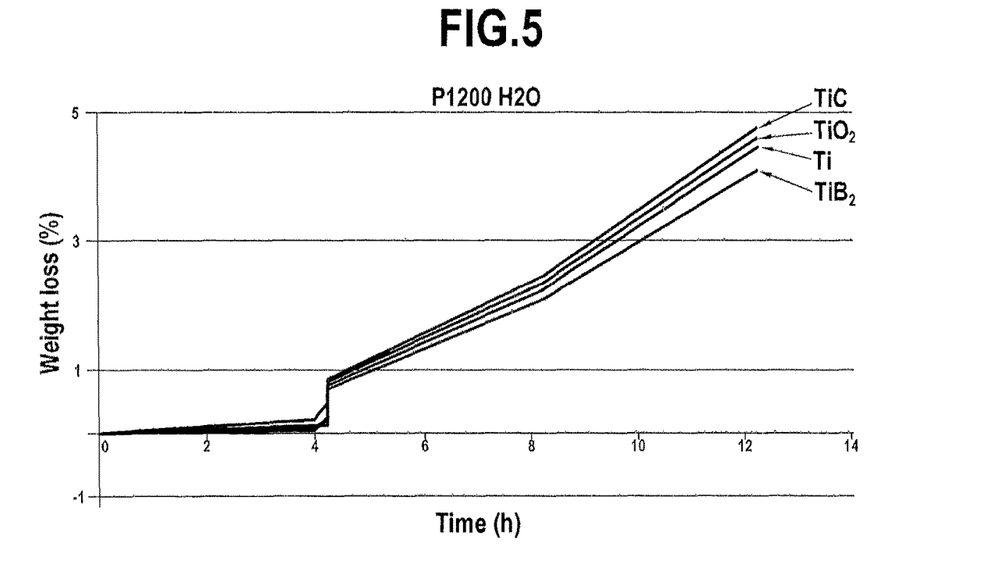
FIG. 5 shows performance in terms of protection against oxidation for coating compositions incorporating various compounds comprising titanium.

The formulations by weight of the second composition sued are given below:
"Ti" composition (the corresponding curve is labeled "Ti" in the drawings):
- 34% monoaluminum phosphate;
- 16% $B_4C$ powder;
- 11.2% titanium powder; and
- 38.3% water.

"TiB$_2$" composition (the corresponding curve is labeled "TiB$_2$" in the drawings):
- 34.4% monoaluminum phosphate;
- 14.2% $B_4C$ powder;
- 16% $TiB_2$ powder;
- 1% Surfynol®; and
- 34.4% water.

"TiC" composition (the corresponding curve is labeled "TiC" in the drawings):
- 36% monoaluminum phosphate;
- 12.2% $B_4C$ powder;
- 14.7% TiC powder;
- 1% Surfynol®; and
- 36% water.

"TiO$_2$" composition (the corresponding curve is labeled "TiO$_2$" in the drawings):
- 34.75% monoaluminum phosphate;
- 11.8% $B_4C$ powder;
- 17.8% $TiO_2$ powder;
- 1% Surfynol®; and
- 34.75% water.

As shown in FIG. 5, the use of various compounds comprising titanium makes it possible to obtain very good resistance to oxidation, including at high temperature and in the presence of water, since weight loss was less than 5%.

EXAMPLE 4

Composition Including a Self-Healing Vitreous Compound

A part made of C/C composite material for an airplane brake disk having density lying in the range 1.65 g/cm³ to 1.9 g/cm³ approximately and residual porosity by volume lying in the range 6% to 18% approximately was provided with anti-oxidation protection as follows:
- impregnating with a first composition formed by an aqueous solution of "Marlophen NP 9" and drying;
- using a brush to apply an aqueous solution of monoaluminum phosphate at 50% by weight of water;
- applying heat treatment under an atmosphere of nitrogen ($N_2$) by progressively raising temperature up to 700° C. and maintaining this temperature for 1 h minimum;
- using a brush to apply the following second composition comprising by weight:
  - 30% monoaluminum phosphate;
  - 14.5% $B_4C$ powder;
  - 9.8% titanium powder;
  - 1% Surfynol®;
  - 34% water; and
  - 10.7% "Pyrex®" glass powder; and
- applying heat treatment under air by raising temperature progressively up to 350° C. and maintaining this temperature for 10 h.

Figure 6:
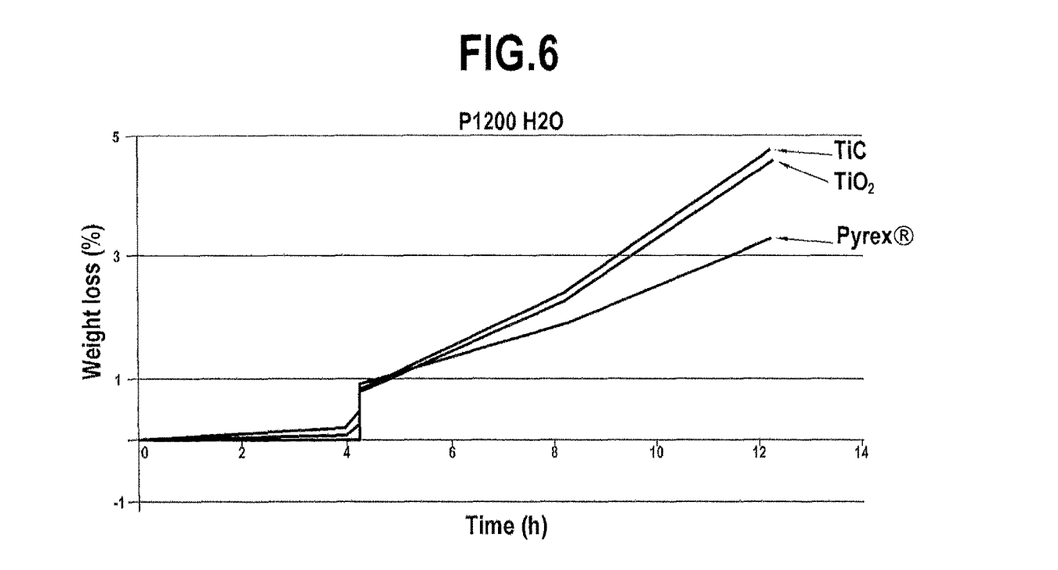
FIG. 6 shows in particular performance in terms of protection against oxidation for a coating composition including a borosilicate type vitreous compound.

The corresponding curve is labeled "Pyrex®" in the drawings.

The composition of Pyrex is substantially as follows (percentages by weight):
- $SiO_2$: 80.60%;
- $B_2O_3$: 12.60%;
- $Na_2O_3$: 4.2%;
- $Al_2O_3$: 2.25%;
- Cl: 0.1%;
- CaO: 0.1%;
- MgOP: 0.05%; and
- $Fe_2O_3$: 0.05%.

It can be seen that such a coating composition provides excellent protection against oxidation (see FIG. 6). For reference, the "TiC" and "TiO$_2$" curves described above are also shown in FIG. 6.

EXAMPLE 5

Influence of the Temperature of the Heat Treatment Performed During Step b

In this example, a part made of C/C composite material for an airplane brake disk having density lying in the range 1.65 g/cm³ to 1.9 g/cm³ approximately and residual porosity by volume lying in the range 6% to 18% approximately was provided with anti-oxidation protection as follows:
- impregnating with a first composition formed by an aqueous solution of "Marlophen NP 9" and drying;
- using a brush to apply an aqueous solution of monoaluminum phosphate at 50% by weight of water;
- applying heat treatment under an atmosphere of nitrogen ($N_2$) by progressively raising temperature up to 700° C. and maintaining this temperature for 1 h minimum;
- using a brush to apply the following second composition comprising by weight:
  - 33.5% monoaluminum phosphate;
  - 16.3% $B_4C$ powder;
  - 11% titanium powder;
  - 1% Surfynol®; and
  - 38.2% water; and
- applying heat treatment under air by raising temperature progressively up to 650° C. and maintaining this temperature for 1 h minimum.

Figure 7:
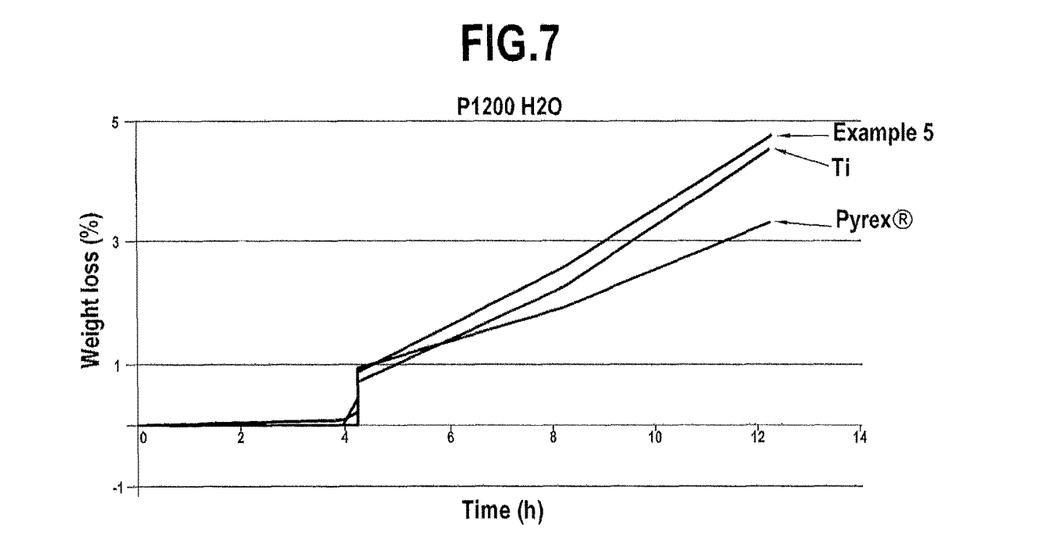
FIG. 7 shows performance in terms of protection against oxidation imparted by various methods of embodiments of the invention.

The corresponding curve is labeled "Example 5" in the drawings.

FIG. 7 shows that after heat treatment at 650° C., good oxidation resistance properties are obtained. FIG. 7 also shows the "Ti" and "Pyrex" curves described above.

1D/2D NMR spectroscopic analysis of the $^{31}P$ and $^{27}Al$ solid nuclei served to quantify the proportions by weight of the crystalline and amorphous phases of the metallic phosphate in the resulting coating. The results obtained are given in Table 2 below.

TABLE 2

| Sample | Crystalline metallic phosphate content | Amorphous metallic phosphate content |
|---|---|---|
| Example 5: 650° C., 1 h, $N_2$ | 59% | 41% |

Figure 8:
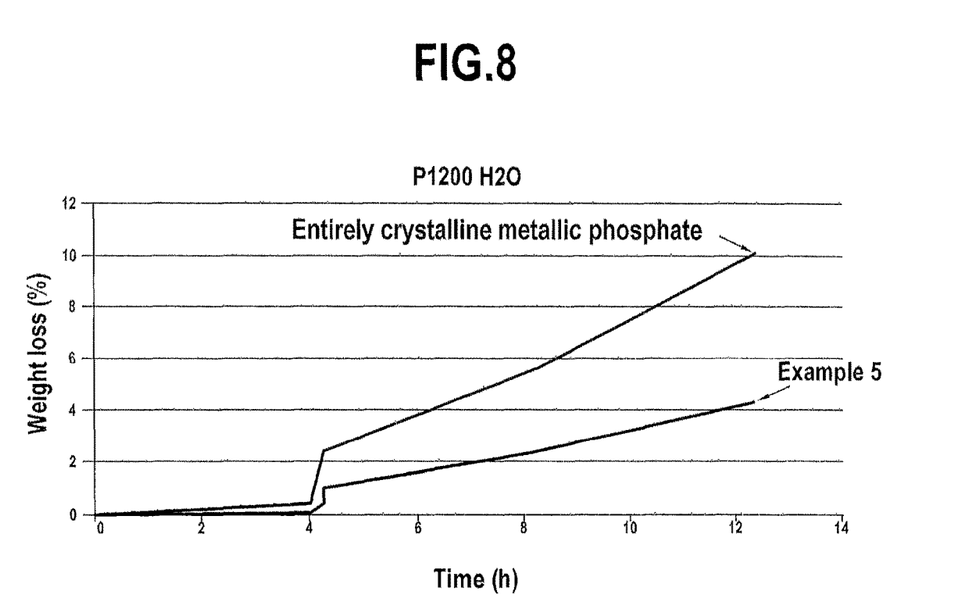
FIG. 8 compares performance in terms of the protection imparted against oxidation firstly by a method of an embodiment of the invention and secondly by a known method of the prior art.

FIG. 8 compares the performance in terms of protection against oxidation (P1200 $H_2O$ protocol) of a Coating constituted by a metallic phosphate composition entirely in crystalline form (labeled in FIG. 8 as "entirely crystalline metallic phosphate") with the performance of a coating obtained after treatment in accordance with Example 5 of an embodiment of the invention. FIG. 8 shows that the protective coating obtained after performing a method of an embodiment of the invention provides very good resistance to oxidation in comparison with methods known in the prior art.

The term "comprising/containing/including a" should be understood as "comprising/containing/including at least one".

The term "lying in the range . . . to . . . " should be understood as including the limits.

The invention claimed is:

1. A method of protecting a part made of carbon-including composite material against oxidation, the method comprising:
   a) applying a coating composition on at least a portion of an outside surface of the part, the coating composition being in the form of an aqueous suspension comprising:
      a metallic phosphate;
      a powder of a compound comprising titanium; and
      a $B_4C$ powder; and
   b) applying heat treatment to the coating composition applied during step a) with a treatment temperature lying in the range 330° C. to 730° C. being imposed during the heat treatment in order to obtain a coating on the outside surface of the part, the coating comprising a first phase in which the metallic phosphate is in crystalline form and a second phase in which the metallic phosphate is in amorphous form.

2. The method according to claim 1, wherein the coating composition also comprises an organic dispersing agent.

3. The method according to claim 2, wherein the organic dispersing agent is an alkoxylated acetylenic polyol.

4. The method according to claim 1, wherein the titanium-comprising compound is selected from the group consisting of titanium metal, titanium diboride, titanium carbide, titanium dioxide, and mixtures thereof.

5. The method according to claim 4, wherein the coating composition includes a powder of titanium metal and/or a powder of titanium diboride.

6. The method according to claim 1, wherein the coating composition includes an aluminum phosphate.

7. The method according to claim 1, wherein the coating composition further includes a self-healing vitreous compound.

8. The method according to claim 1, wherein the coating composition comprises, before step a):
   the metallic phosphate at a content by weight lying in the range 27% to 36%;
   the $B_4C$ powder at a content by weight lying in the range 11.5% to 21%; and
   the powder of the titanium-comprising compound at a content by weight lying in the range 8% to 18%.

9. The method according to claim 8, wherein the coating composition comprises, before step a):
   aluminum phosphate at a content by weight lying in the range 27% to 36%;
   the $B_4C$ powder at a content by weight lying in the range 11.5% to 21%;
   the powder of the titanium-comprising compound at a content by weight lying in the range 8% to 18%;
   an alkoxylated acetylenic polyol at a content by weight lying in the range 0.1% to 1.5%; and
   water at a content by weight lying in the range 33% to 50%.

10. The method according to claim 1, wherein at least one internal protection layer is formed before step a) by impregnating at least a portion of the part made of composite material with an impregnation composition including a metallic phosphate.

11. The method according to claim 10, wherein the impregnation composition comprises aluminum phosphate.

12. The method according to claim 1, wherein the treatment temperature is imposed during the heat treatment for a duration greater than or equal to 1 hour.

* * * * *